(12) United States Patent
Chang

(10) Patent No.: US 12,506,346 B1
(45) Date of Patent: Dec. 23, 2025

(54) DOCK FOR A PORTABLE ELECTRONIC DEVICE

(71) Applicant: Richcom Power, LLC, West Palm Beach, FL (US)

(72) Inventor: Tzu-Yung Chang, Wellington, FL (US)

(73) Assignee: Richcom Power, LLC, West Palm Beach, FL (US)

( * ) Notice: Subject to any disclaimer, the term of this patent is extended or adjusted under 35 U.S.C. 154(b) by 588 days.

(21) Appl. No.: 18/071,429

(22) Filed: Nov. 29, 2022

Related U.S. Application Data

(60) Provisional application No. 63/283,934, filed on Nov. 29, 2021.

(51) Int. Cl.
| | |
|---|---|
| *G06F 1/16* | (2006.01) |
| *H02J 7/00* | (2006.01) |
| *H05K 5/00* | (2025.01) |
| *H05K 7/00* | (2006.01) |

(52) U.S. Cl.
CPC .................................. *H02J 7/0044* (2013.01)

(58) Field of Classification Search
CPC ...... H02J 7/0044; H02J 7/0042; H02J 7/0045; G06F 1/1632; G06F 1/1654
See application file for complete search history.

(56) References Cited

U.S. PATENT DOCUMENTS

| | | | | |
|---|---|---|---|---|
| 6,168,079 | B1 * | 1/2001 | Becker ............... | G06K 17/0022 235/383 |
| 9,910,455 | B1 * | 3/2018 | Morrison ............. | G06F 1/1654 |
| 10,067,533 | B1 * | 9/2018 | Powell .................. | G06F 1/1679 |
| 2010/0146308 | A1 * | 6/2010 | Gioscia ................... | H02J 50/90 307/104 |
| 2013/0092805 | A1 * | 4/2013 | Funk ....................... | F16M 13/00 248/274.1 |
| 2014/0191034 | A1 * | 7/2014 | Glanzer ................ | G06F 1/1628 235/449 |
| 2014/0313665 | A1 * | 10/2014 | Delpier ................. | G06F 1/1616 361/679.55 |
| 2017/0220076 | A1 * | 8/2017 | Gerbus ................. | G06F 1/1632 |
| 2017/0271900 | A1 | 9/2017 | Rose et al. | |
| 2018/0232543 | A1 * | 8/2018 | Mori ...................... | G06F 1/1654 |
| 2019/0258300 | A1 * | 8/2019 | Gerardi ................ | G06F 1/1686 |
| 2021/0080999 | A1 * | 3/2021 | Bryant .................. | G06F 1/1641 |
| 2022/0313342 | A1 * | 10/2022 | Leuck .................... | A61B 90/36 |
| 2024/0176400 | A1 * | 5/2024 | Lai ........................ | G06F 1/1643 |

* cited by examiner

*Primary Examiner* — Anthony M Haughton
(74) *Attorney, Agent, or Firm* — The Law Office of Patrick F. O'Reilly III, LLC

(57) ABSTRACT

A dock for a portable electronic device is disclosed herein. The dock includes a clamping apparatus having a first sliding member with a first upstanding clamp holder element; a second sliding member with a second upstanding clamp holder element; and an activation lever rotatable between a disengaged clamping position and an engaged clamping position. When a user rotates the activation lever from the disengaged clamping position to the engaged clamping position, the first and second upstanding clamp holder elements are configured to be displaced inwardly toward one another so as to clamp a portable electronic device into the dock. When a user rotates the activation lever from the engaged clamping position to the disengaged clamping position, the first and second upstanding clamp holder elements are configured to be displaced outwardly away from one another so as to release the portable electronic device from the dock.

6 Claims, 12 Drawing Sheets

DOCK FOR A PORTABLE ELECTRONIC DEVICE

CROSS-REFERENCE TO RELATED APPLICATIONS

This patent application claims priority to, and incorporates by reference in its entirety, U.S. Provisional Patent Application No. 63/283,934, entitled "Dock For A Portable Electronic Device", filed on Nov. 29, 2021.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a dock for a portable electronic device. More particularly, the invention relates to dock that includes a clamping apparatus mounted to a charging module, where the clamping apparatus of the charging dock is for securing a mobile radio including its battery or the battery alone.

2. Background

Mobile radios have charging stations that can be mounted inside vehicles. Vibrations or inadvertent bumping of the charger can result in an intermittent charge or complete loss of the charging function. There is a need for a mobile charger or add-on mechanism that can secure and maintain the charging function under high vibratory conditions, or if the mobile charger falls over or loses its upright orientation.

BRIEF SUMMARY OF EMBODIMENTS OF THE INVENTION

Accordingly, the present invention is directed to a dock for a portable electronic device that substantially obviates one or more problems resulting from the limitations and deficiencies of the related art.

In accordance with one or more embodiments of the present invention, there is provided a dock for a portable electronic device comprising a clamping apparatus that includes a first sliding member, the first sliding member including a first upstanding clamp holder element; a second sliding member, the second sliding member including a second upstanding clamp holder element; and an activation lever rotatable between a disengaged clamping position and an engaged clamping position. When a user rotates the activation lever in a first rotational direction from the disengaged clamping position to the engaged clamping position, the first and second upstanding clamp holder elements are configured to be displaced inwardly toward one another so as to clamp a portable electronic device into the dock. When a user rotates the activation lever in a second rotational direction from the engaged clamping position to the disengaged clamping position, the first and second upstanding clamp holder elements are configured to be displaced outwardly away from one another so as to release the portable electronic device from the dock.

In a further embodiment of the present invention, the clamping apparatus further comprises a first spring member operatively coupled to the first sliding member and a second spring member operatively coupled to the second sliding member; the first and second spring members are configured to bias the first and second sliding members in the disengaged clamping position; and the first and second spring members are configured to regulate the opposed forces that are applied to opposite sides of the portable electronic device.

In yet a further embodiment, the clamping apparatus further comprises a first pad member attached to the first upstanding clamp holder element of the first sliding member and a second pad member attached to the second upstanding clamp holder element of the second sliding member; and when the user rotates the activation lever in the first rotational direction from the disengaged clamping position to the engaged clamping position, the first and second pad members are configured to be clamped against opposite sides of the portable electronic device.

In still a further embodiment, the clamping apparatus further comprises a base plate configured to secure the clamping apparatus to the dock; and the first sliding member and the second sliding member are each displaceably coupled to the base plate such that the first sliding member and the second sliding member are displaced relative to the base plate when the user rotates the activation lever in the first rotational direction from the disengaged clamping position to the engaged clamping position, and when the user rotates the activation lever in the second rotational direction from the engaged clamping position to the disengaged clamping position.

In yet a further embodiment, the dock is in a form of a battery charging station for the portable electronic device, the battery charging station comprising a recess for receiving a bottom portion of the portable electronic device.

In still a further embodiment, the portable electronic device received within the recess of the battery charging station comprises one of: (i) a battery for a mobile electronic device, and (ii) a mobile electronic device that includes a battery.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
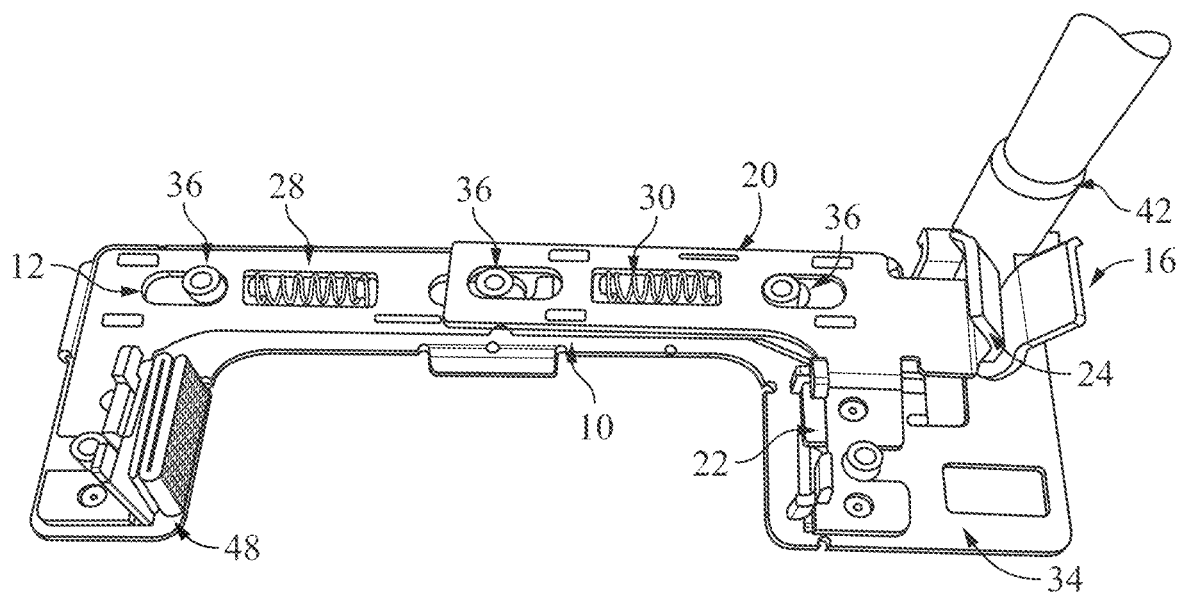
FIG. 1 is an assembled perspective view of a clamping apparatus of the dock for a portable electronic device, according to an illustrative embodiment of the invention.
Figure 6:
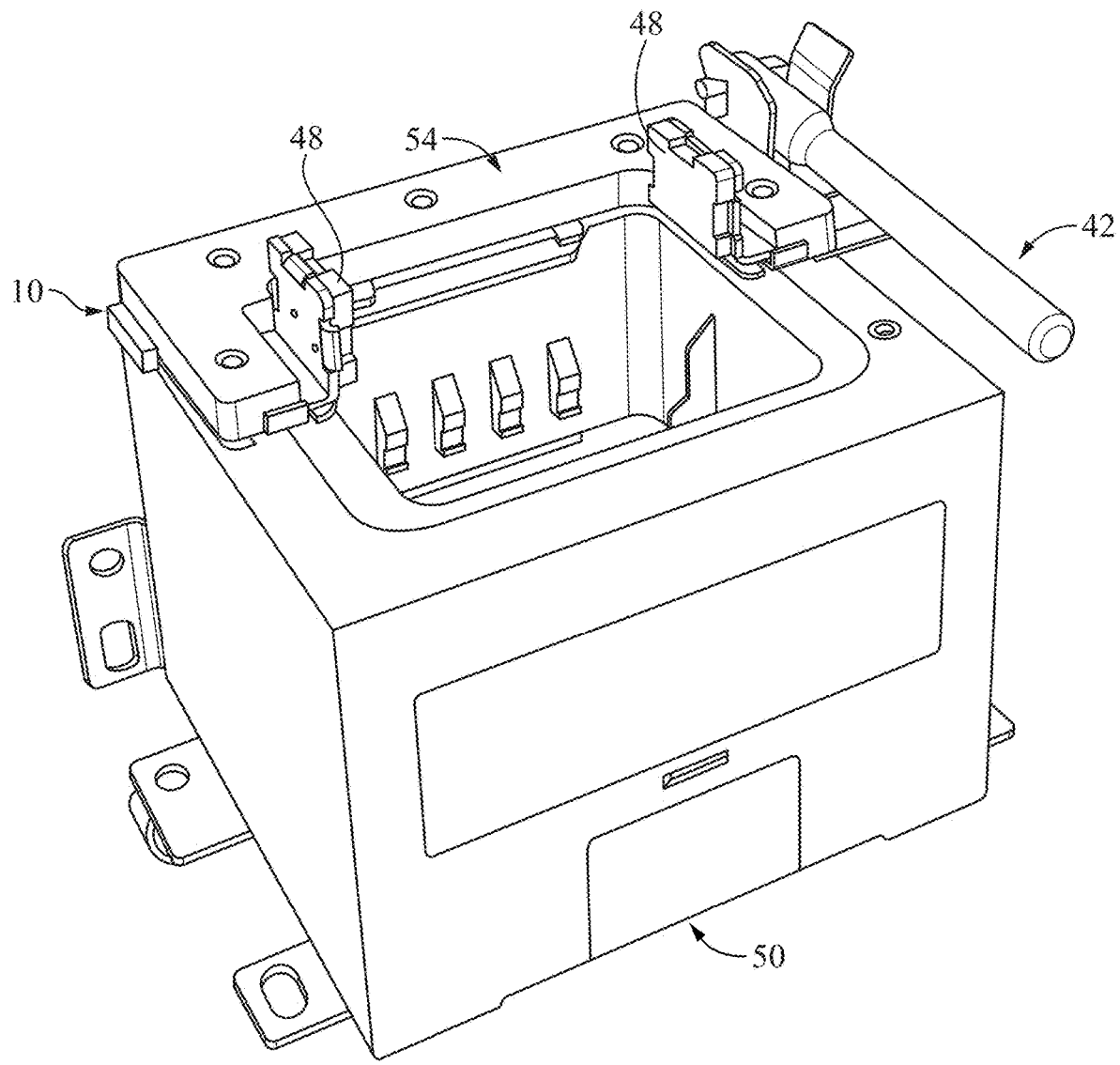
FIG. 6 is another perspective view of the dock for a portable electronic device of FIG. 2.
Figure 7:
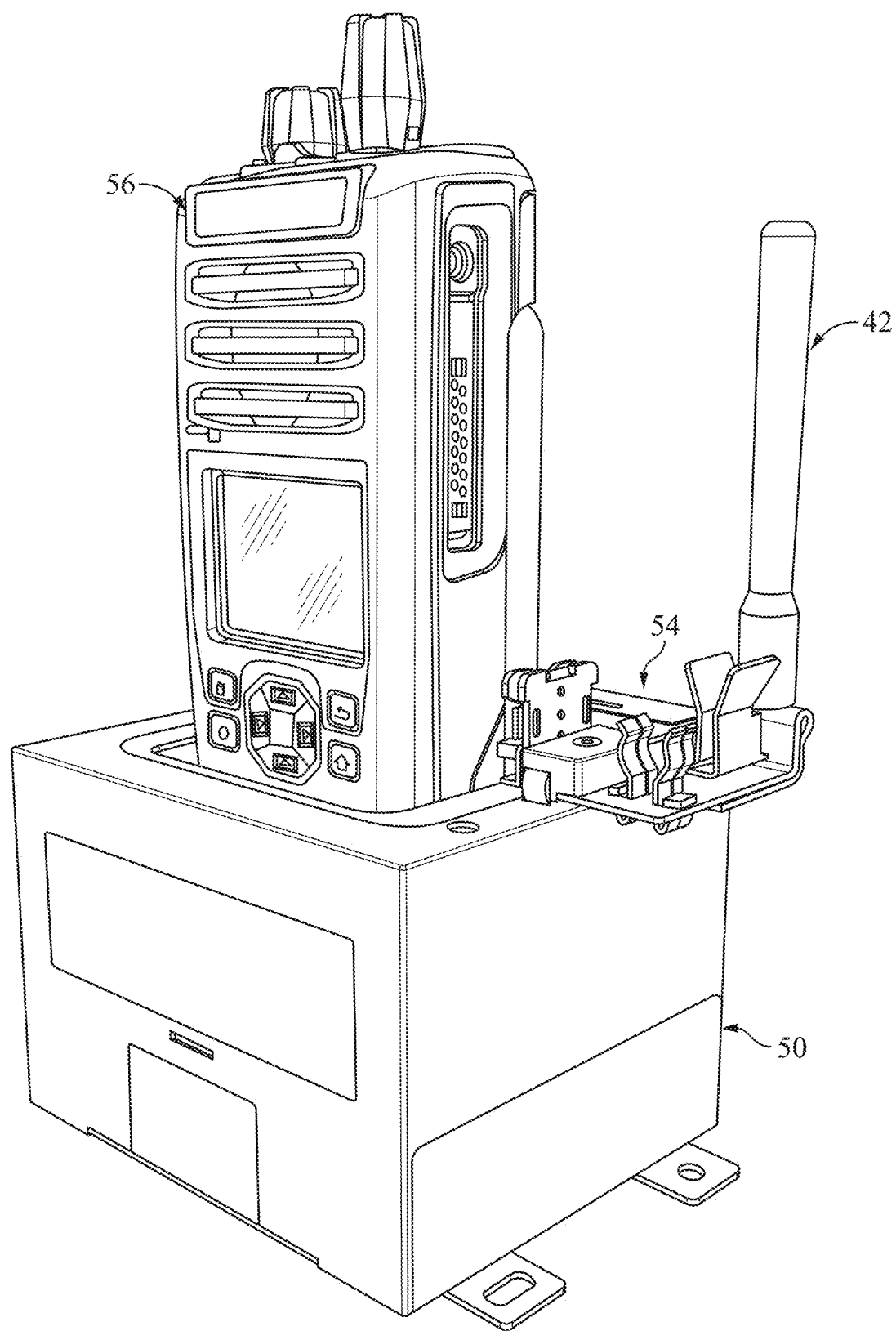
FIG. 7 is yet another perspective view of the dock for a portable electronic device of FIG. 2, where a mobile electronic device is disposed in the recess of the dock and the activation lever is in disengaged clamping position.
Figure 8:
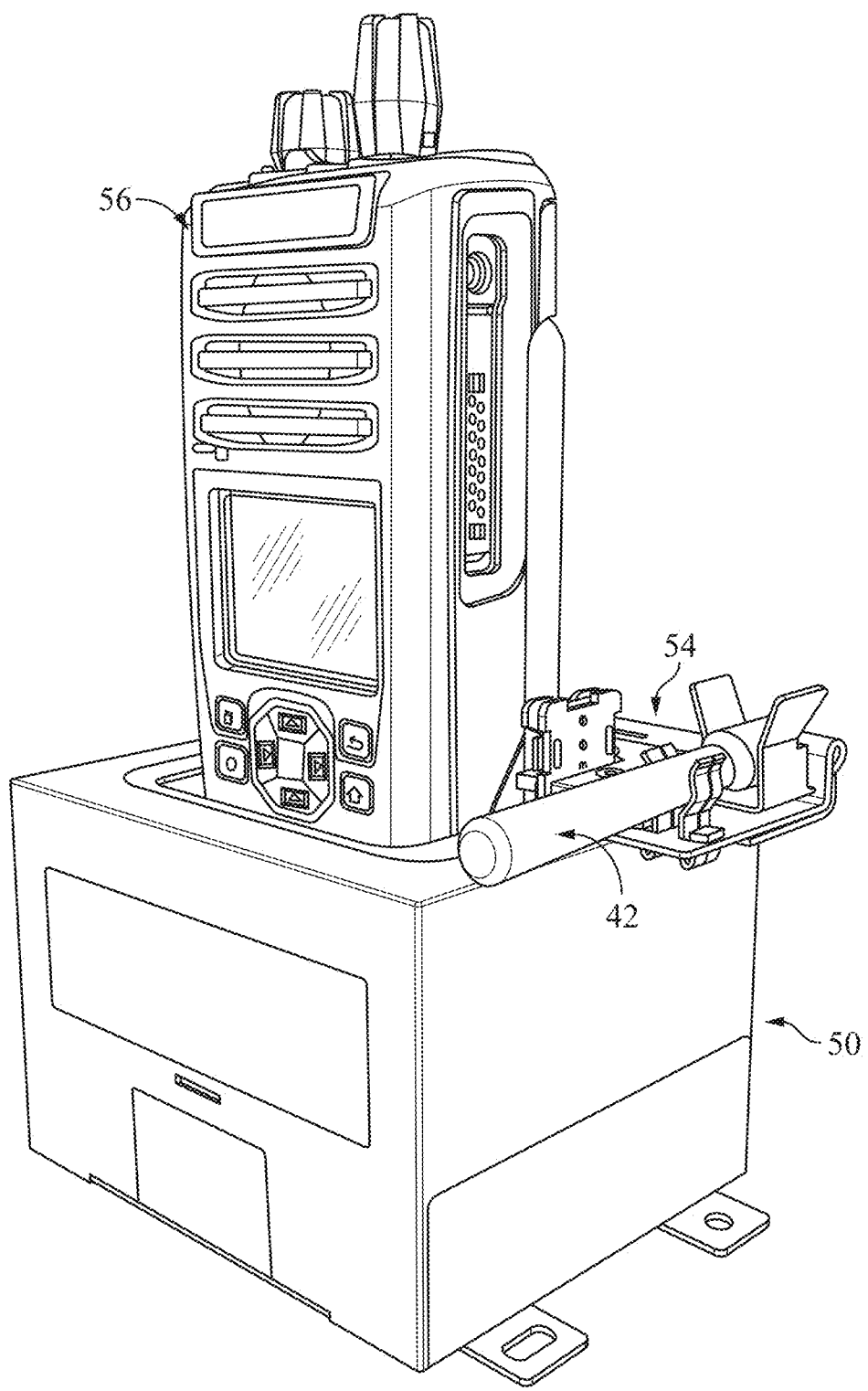
FIG. 8 is still another perspective view of the dock for a portable electronic device of FIG. 2, where a mobile electronic device is disposed in the recess of the dock and the activation lever is in engaged clamping position.

An illustrative embodiment of a dock for a portable electronic device is seen generally at 50 in FIGS. 1 and 6. With initial reference to FIGS. 1-3, it can be seen that the dock 50 comprises a clamping apparatus 10 that includes a first sliding member 12, the first sliding member 12 including a first upstanding clamp holder element 14; a second sliding member 20, the second sliding member 20 including a second upstanding clamp holder element 22; and an activation lever 42 rotatable between a disengaged clamping position (e.g., as shown in FIG. 7) and an engaged clamping position (e.g., as shown in FIG. 8). In the illustrative embodiment, when a user rotates the activation lever 42 in a first rotational direction from the disengaged clamping position (FIG. 7) to the engaged clamping position (FIG. 8), the first and second upstanding clamp holder elements 14, 22 are configured to be displaced inwardly toward one another so as to clamp a portable electronic device (e.g., a mobile radio 56) into the dock 50 (see FIG. 8). Conversely, in the illustrative embodiment, when a user rotates the activation lever 42 in a second rotational direction from the engaged clamping position (FIG. 8) to the disengaged clamping position (FIG. 7), the first and second upstanding clamp holder elements 14, 22 are configured to be displaced outwardly away from one another so as to release the portable electronic device 56 from the dock 50.

Figure 3:
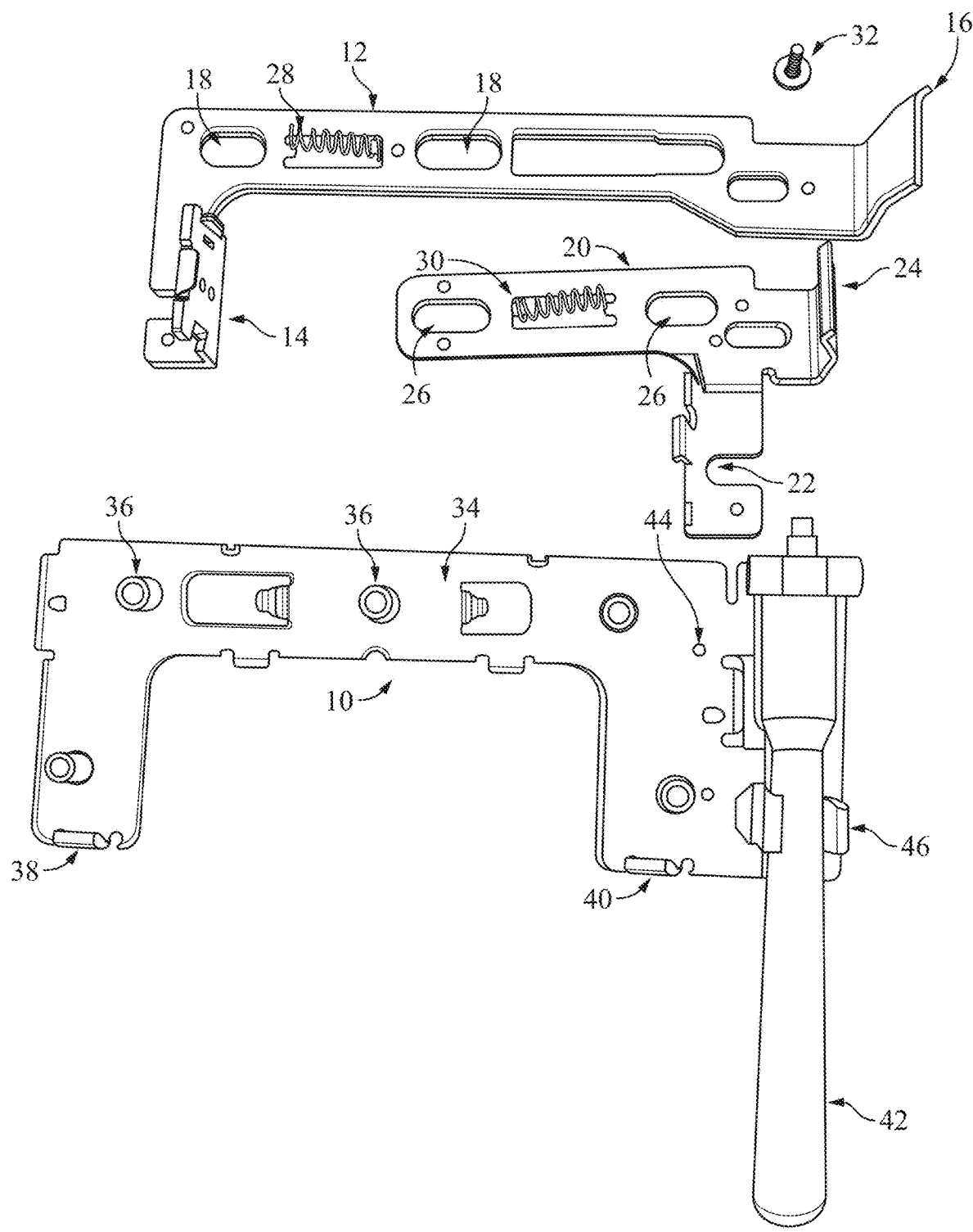
FIG. 3 is an exploded perspective view of the clamping apparatus of FIG. 1.
Figure 4:
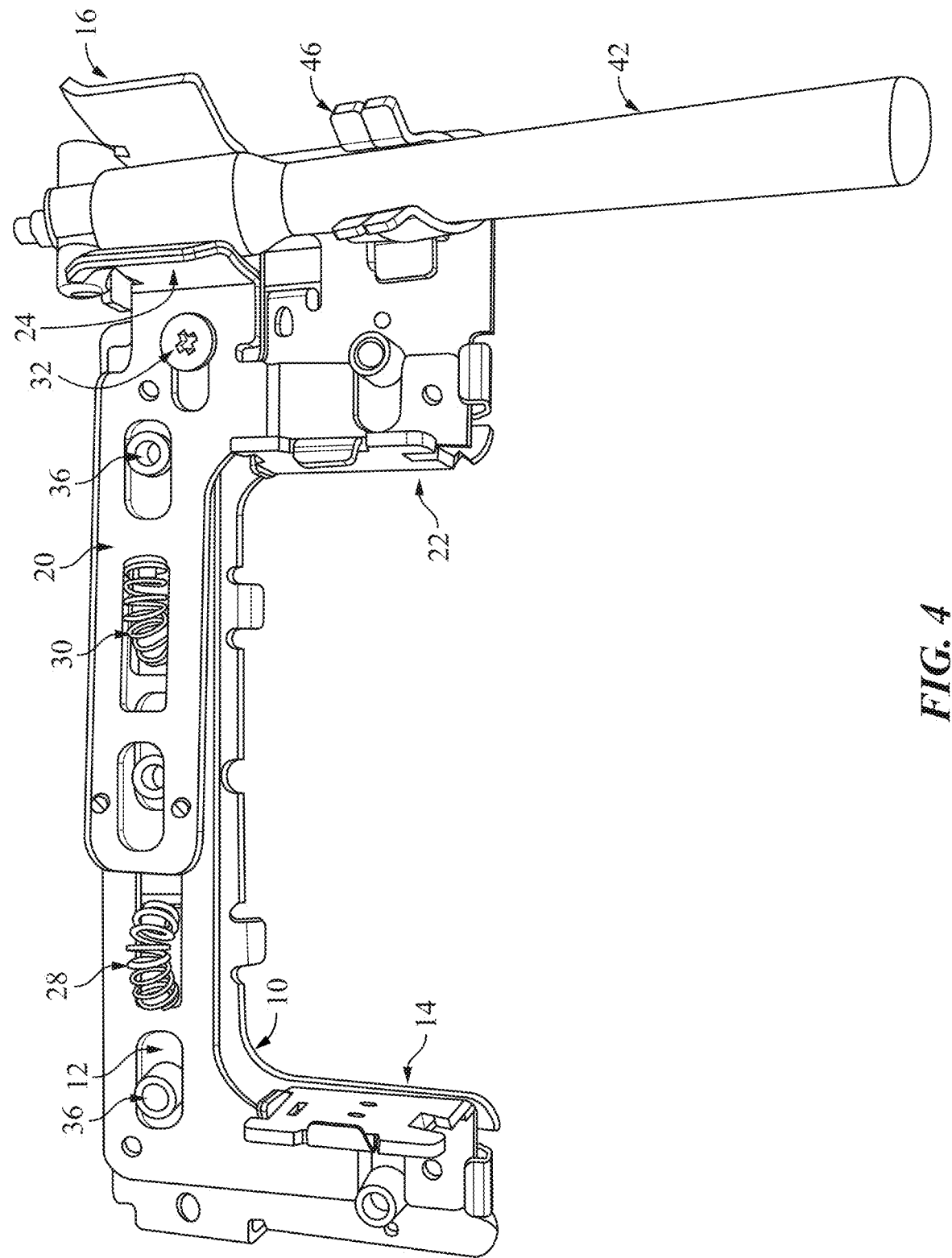
FIG. 4 is another assembled perspective view of the clamping apparatus of FIG. 1, where the activation lever is in the engaged clamping position.

In the illustrative embodiment, with reference to FIGS. 1, 3, and 4, it can be seen that the clamping apparatus 10 further comprises a first spring member 28 operatively coupled to the first sliding member 12 and a second spring member 30 operatively coupled to the second sliding member 20. The first and second spring members 28, 30 are configured to bias the first and second sliding members 12, 20 in the disengaged clamping position (refer to FIGS. 1 and 7). The first and second spring members 28, 30 also are configured to regulate the opposed forces that are applied to opposite sides of the portable electronic device (e.g., a mobile radio 56). In the illustrative embodiment, each of the first and second spring members 28, 30 may be in a form of a compression spring.

Turning again to FIGS. 1, 3, and 4, in the illustrative embodiment, it can be seen that the first sliding member 12 may be provided with a first activation lever holder 16 and the second sliding member 20 may be provided with a second activation lever holder 24. When the activation lever 42 is in the disengaged clamping position (see FIGS. 1 and 7), the first and second activation lever holders 16, 24 are disposed adjacent to one another (i.e., the first and second spring members 28, 30 urge the first and second activation lever holders 16, 24 of the first and second sliding members 12, 20 together). However, when the activation lever 42 is rotated by a user from the disengaged clamping position of FIGS. 1 and 7 to the engaged clamping position of FIGS. 4 and 8, the activation lever 42 pushes the first and second activation lever holders 16, 24 apart such that the spring members 28, 30 are compressed and the sliding members are displaced in opposite directions until the first and second activation lever holders 16, 24 are disposed on opposite sides of the activation lever 42 in the position of FIGS. 4 and 8. As shown in FIG. 1, the first and second activation lever holders 16, 24 are provided with flared ends that together form a V-shape for facilitating the pushing apart of the first and second activation lever holders 16, 24 by the activation lever 42.

In the illustrative embodiment, the clamping apparatus 10 further comprises a first pad member 48 attached to the first upstanding clamp holder element 14 of the first sliding member 12 and a second pad member 48 attached to the second upstanding clamp holder 22 element of the second sliding member 20 (refer to FIGS. 1, 3, and 6). When the user rotates the activation lever 42 in the first rotational direction from the disengaged clamping position (FIG. 7) to the engaged clamping position (FIG. 8), the first and second pad members 48 are configured to be clamped against opposite sides of the portable electronic device 56 (refer to FIG. 8).

Referring again to FIGS. 1 and 3, in the illustrative embodiment, the clamping apparatus 10 further comprises a base plate 34 configured to secure the clamping apparatus 10 to the dock 50. For example, in the illustrative embodiment, the base plate 34 may be secured to the top of the dock 50 using a plurality of screws (e.g., five (5) screws). The first sliding member 12 and the second sliding member 20 are each displaceably coupled to the base plate 34 such that the first sliding member 12 and the second sliding member 20 are displaced relative to the base plate 34 when the user rotates the activation lever 42 in the first rotational direction from the disengaged clamping position (FIG. 7) to the engaged clamping position (FIG. 8), and when the user rotates the activation lever 42 in the second rotational direction from the engaged clamping position (FIG. 8) to the disengaged clamping position (FIG. 7). In addition, as shown in FIG. 3, a locking screw 32 may be provided to secure first and second sliding members 12, 20 to the base plate 34. Each of the first and second sliding members 12, 20 may comprise an elongated aperture for receiving the locking screw 32, but still allowing the movement of the sliding members 12, 20 relative to the base plate 34. In FIG. 3, it can be seen that the base plate 34 is provided with a tapped hole 44 for receiving the locking screw 32 therein. In order to regulate the movement of the sliding members 12, 20 to a generally linear direction, the base plate 34 is provided with a plurality of tubular bosses 36 that are received within elongated apertures 18 of the first sliding member 12 and elongated apertures 26 of the second sliding member 20. The elongated apertures 18, 26 of the first and second sliding members 12, 20 also limit the extent of travel of the first and second sliding members 12, 20 because the extent of travel of the first and second sliding members 12, 20 is limited by the tubular bosses 36 contacting the opposite ends of the elongated apertures 18, 26. Also, as shown in the illustrative embodiment of FIG. 3, the base plate 34 further comprises first and second capture bends 38, 40 for retaining the first and second sliding members 12, 20 against the top surface of the base plate 34. In addition, with combined reference to FIGS. 3 and 4, it can be seen that the base plate 34 may further comprise an activation lever holder member 46 (e.g., in a form of a clip) for retaining the activation lever 42 when the lever is disposed its engaged clamping position (see FIGS. 4 and 8). The pivot end of the activation lever 42 may be hinged-mounted to the base plate 34.

Figure 2:
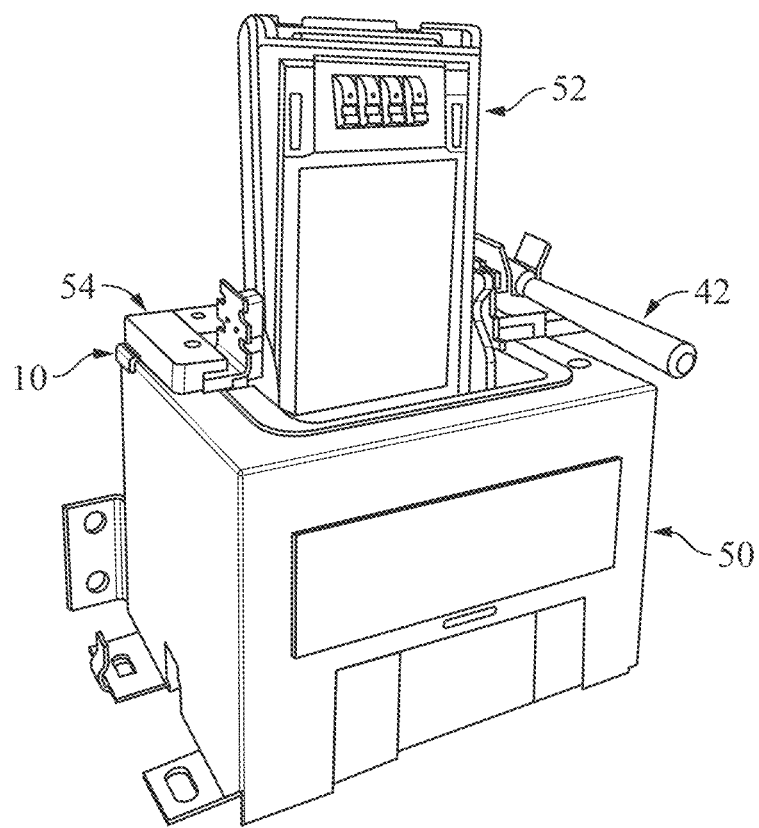
FIG. 2 is a perspective view of a dock for a portable electronic device containing a battery in the recess of the dock, according to the illustrative embodiment of the invention.

In the illustrative embodiment, as shown in FIGS. 2, 7, and 8, the dock 50 is in a form of a battery charging station for the portable electronic device 52, 56, the battery charging station 50 comprising a recess for receiving a bottom portion of the portable electronic device 52, 56. In the illustrative embodiment, the portable electronic device 52, 56 received within the recess of the battery charging station 50 comprises one of: (i) a battery for a mobile electronic device 52, and (ii) a mobile electronic device 56 that includes a battery.

FIG. 1 illustrates the clamping apparatus 10 for use with the mobile radio battery charger 50 depicted in FIG. 2. The clamping apparatus 10 is securable to the dock 50 by the mounting and retainer plate 34. The battery 52 or mobile radio 56 with battery is securable to the dock 50 via the first and second pad members 48, which are in turn attached to each of the upstanding clamp holders 14, 22 of the sliding members 12, 20. When the battery 52 or mobile radio 56 with battery is mounted to the dock 50, the widest portion of the battery 52 or radio 56 is positioned between the two pads 48 that are attached to each slider 12, 20. At this point, the activation lever 42 is in the upright position, as shown in FIG. 1. With the clamping apparatus lever 42 in the upright position and the radio 56 sitting in the charger body, the weight of the radio 56 causes electrical contacts in the charger and at the bottom of the phone to make sufficient contact to supply charging current to the radio/battery 52, 56. When a user pulls the clamping lever 42 down to a horizontal position (see FIG. 2), the two pads 48 connected to each slider 12, 20 move toward each other, thus, securing the battery/phone 52, 56 in the charger module 50. Furthermore, when the sliders 12, 20 move inward, a load is applied to each side of the phone/battery 52, 56. This load is moderated by the incorporation of springs 28, 30 that are in series with the pad plate and the lever plate. The springs 28, 30 are shown in FIG. 1.

As described in the illustrative embodiments herein, a clamping mechanism 10 is mounted to a mobile radio charging module 50. The clamping apparatus 10 is designed to secure a battery 52 or a mobile radio 56 with a battery. Many mobile radio charging stations are mounted in vehicles and subject to vibration. Vibrations transmitted from the vehicle to the charging station can cause intermittent charging or expulsion of the battery 52 or radio 56 with battery and interruption of the charging function. A lever 42 is employed to activate two spring-loaded sliders 12, 20 to secure the battery 52 in the charging module 50. Each of the sliders 12, 20 includes a rubber pad 48 that adds friction and cushion in the fully clamped position (FIG. 8). The clamping mechanism 10 may also include mounting brackets for vertical and horizontal mounting. The clamping apparatus 10 can be pre-assembled to the charging dock 50 or installed as a retrofit.

Now, with reference to FIGS. 1-8, the operation of the illustrative clamping apparatus 10 will be described. In the illustrative embodiment, when the activation lever 42 is in the raised position (refer to FIGS. 1 and 7) the device capture clamps are released from the radio/battery combo or battery alone. When the lever 42 is lowered and locked (see FIGS. 2, 4, and 8), the device capture sliders 12, 20 are clamped to the radio/battery combo or battery alone. The springs 28, 30 are for moving the device slides in unison to clamp or release. The two (2) rubber pads 48 on the device clamping areas are provided to eliminate any damage to the user's radio combo and/or battery alone.

Figure 5:
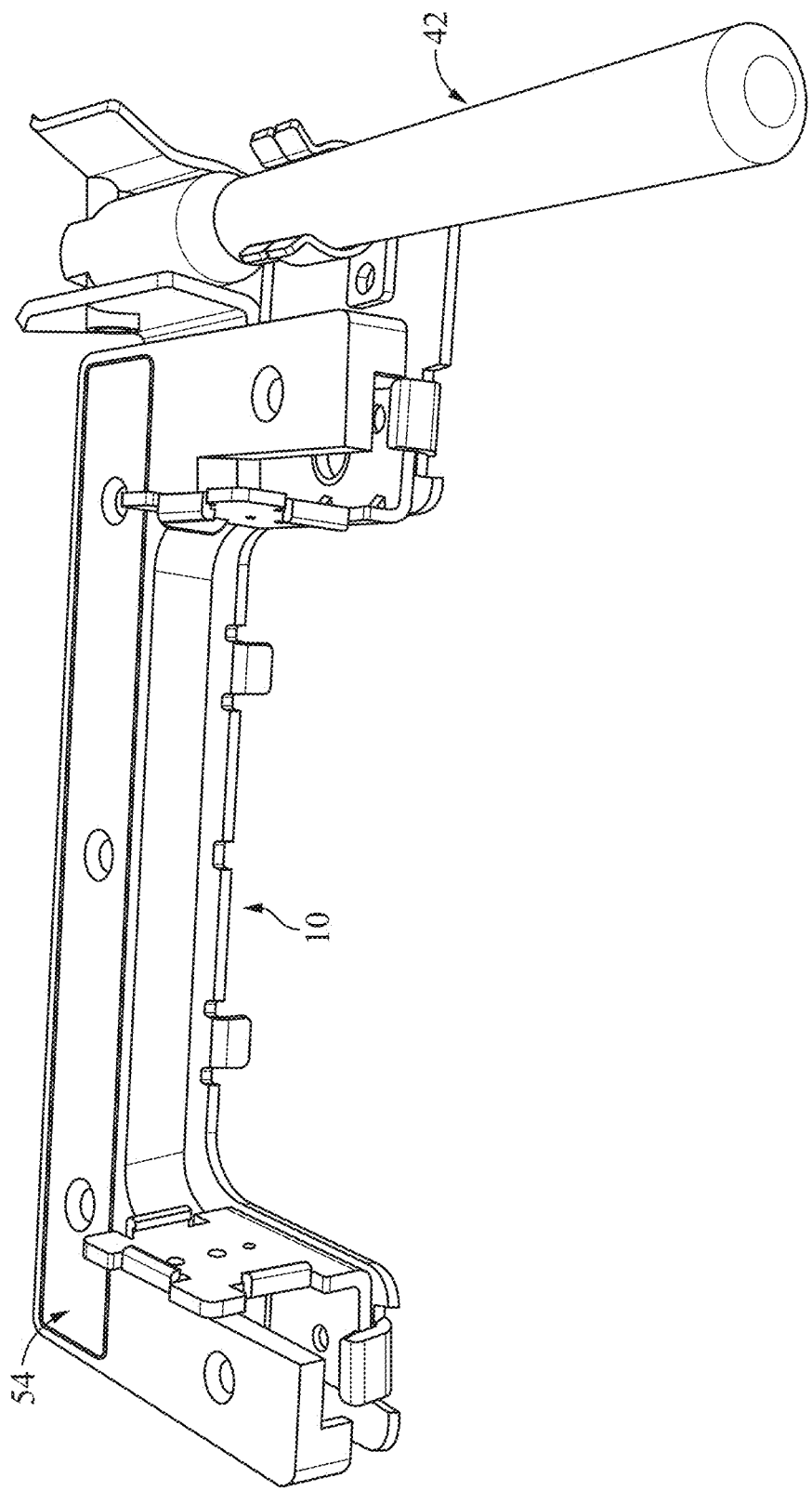
FIG. 5 is yet another assembled perspective view of the clamping apparatus of FIG. 1, where the clamping apparatus is provided with a cover disposed thereon and the activation lever is in the engaged clamping position.

In the illustrative embodiment, as shown in FIGS. 2, 5, and 6, the clamping apparatus 10 may be provided with a top cover 54 disposed thereon in order to protect the internal components of the clamping apparatus 10 and improve the overall aesthetic appearance of the clamping apparatus 10.

Figure 9:
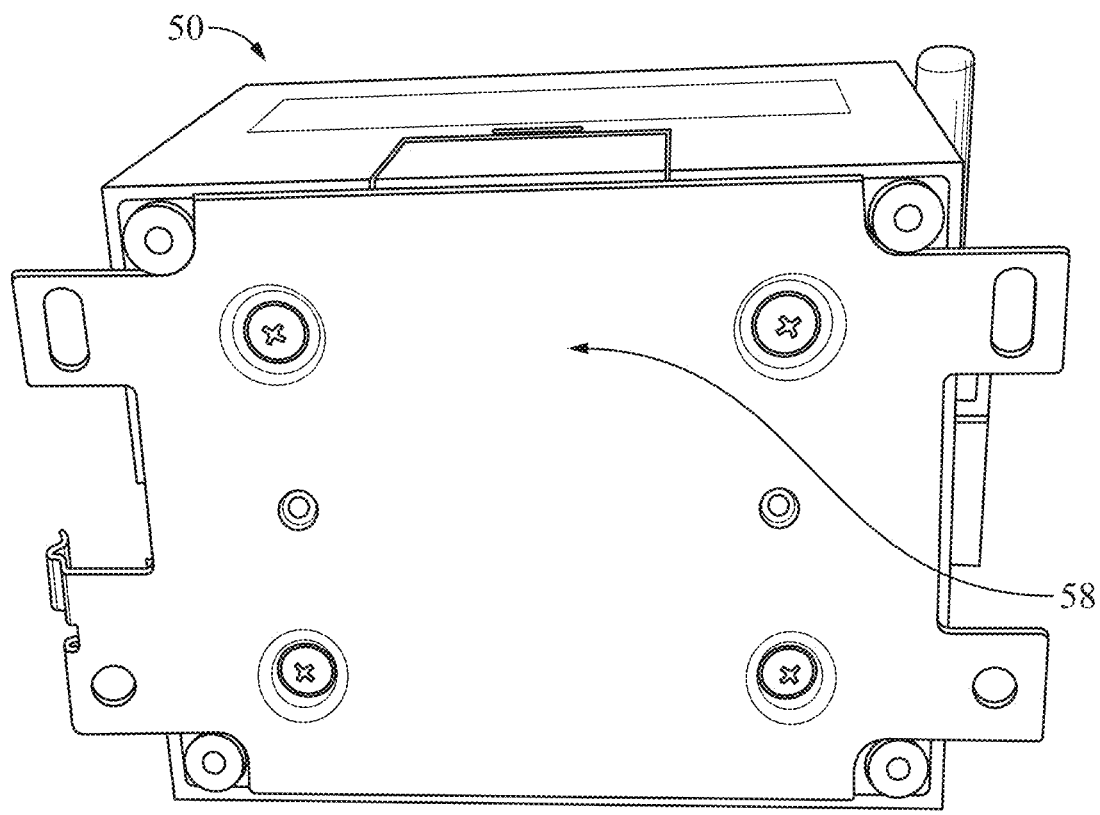
FIG. 9 is a bottom perspective view of the dock for a portable electronic device of FIG. 2, where a base mounting plate of the dock is illustrated.
Figure 10:
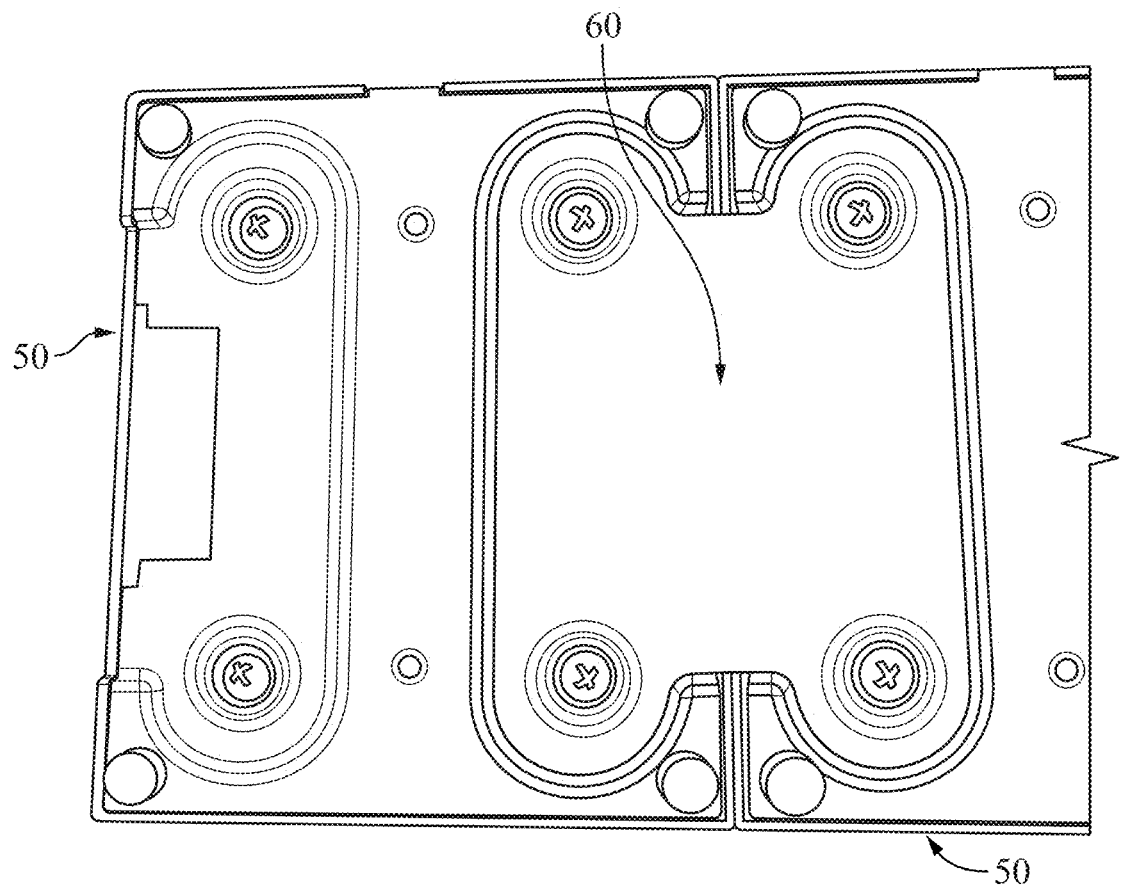
FIG. 10 is a bottom perspective view of a plurality of docks for portable electronic devices connected together by a joining plate so as to form a multi-bay dock arrangement.
Figure 11:
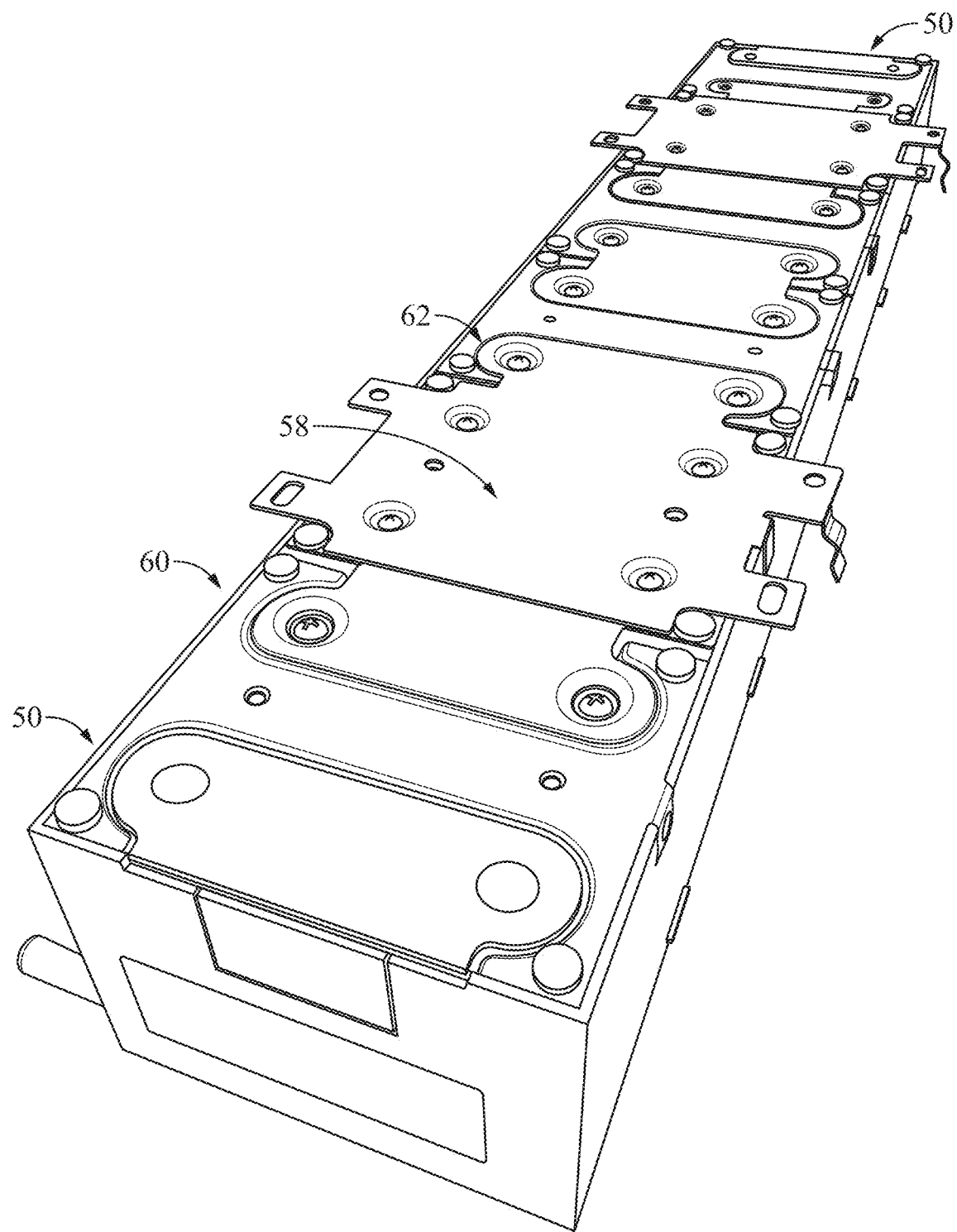
FIG. 11 is a bottom perspective view of a multi-bay dock arrangement, where the base mounting plates and joining plates of the multi-bay dock arrangement are illustrated.

Referring to FIG. 9, in the illustrative embodiment, the bottom of the dock 50 for a portable electronic device may be provided with base mounting plate 58 attached thereto for allowing the dock 50 to be secured to various structures (e.g., floor or dashboard component in the interior of a vehicle).

Figure 12:
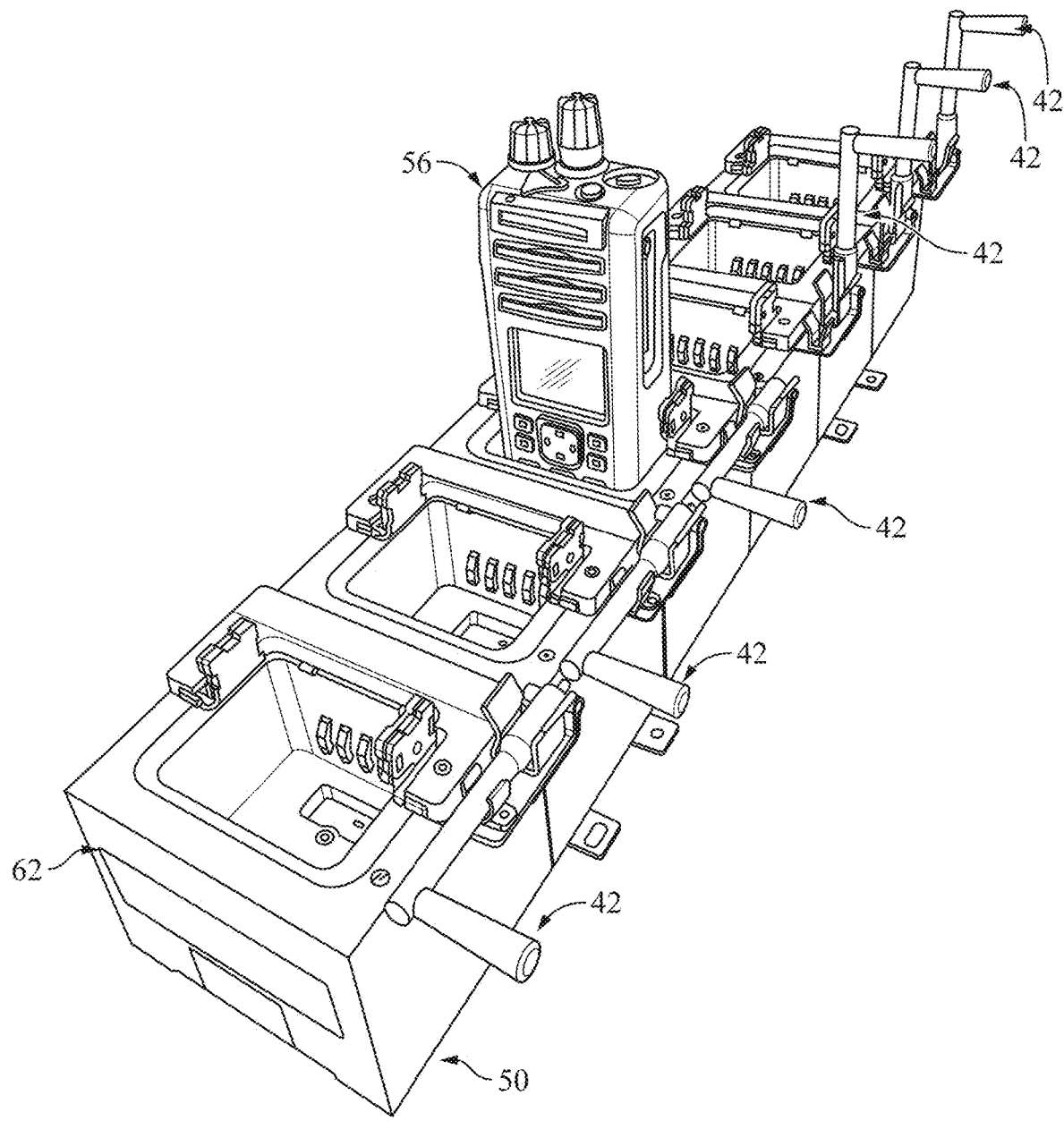
FIG. 12 is a top perspective view of a multi-bay dock arrangement, where a mobile electronic device is disposed in the recess of one of the docks and the first three (3) activation levers of the docks are in their engaged clamping positions.
Figure 13:
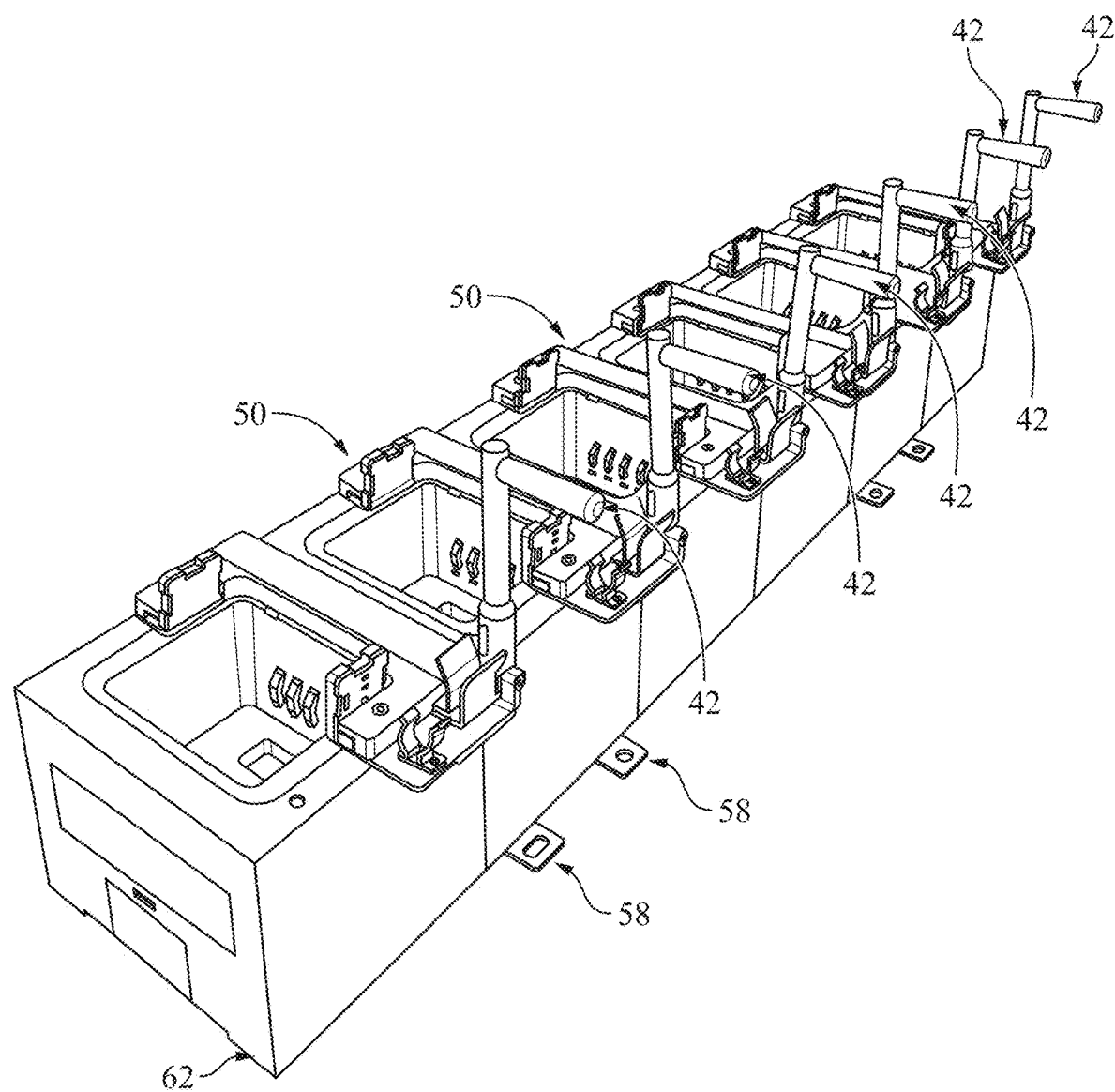
FIG. 13 is another top perspective view of the multi-bay dock arrangement of FIG. 12, where the activation levers of the docks are in their disengaged clamping positions.

Next, with reference to FIGS. 10-13, a multi-bay dock arrangement 62 will be described. As shown in FIGS. 12 and 13, a plurality of docks 50 may be connected together in order to accommodate the charging of a plurality of batteries 52 or a plurality of mobile radios 56. In the illustrative embodiment, referring to FIGS. 10 and 11, multi-bay joining plates 60 (e.g., generally I-shaped plates 60 with four (4) screws) may bridge adjacent dock modules 50 in order to attach the dock modules 50 to one another. In order to secure the multi-bay dock arrangement 62 of FIGS. 12 and 13 to a mounting surface, the multi-bay dock arrangement 62 may be provided with a plurality of spaced-apart mounting plates 58.

It is readily apparent that the aforedescribed dock 50 for a portable electronic device offers numerous advantages. In particular, the clamping apparatus 10 of the charging dock 50 is able to secure and maintain the charging function under high vibratory conditions, or if the mobile charger falls over or loses its upright orientation. Also, the clamping apparatus 10 can be pre-assembled to the charging dock 50 or installed as a retrofit.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A dock for a portable electronic device, comprising:
    a clamping apparatus that includes:
        a first sliding member, the first sliding member including a first upstanding clamp holder element;
        a second sliding member, the second sliding member including a second upstanding clamp holder element; and
        an activation lever rotatable between a disengaged clamping position and an engaged clamping position;
    wherein, when a user rotates the activation lever in a first rotational direction from the disengaged clamping position to the engaged clamping position, the first and second upstanding clamp holder elements are configured to be displaced inwardly toward one another so as to clamp a portable electronic device into the dock; and
    wherein, when a user rotates the activation lever in a second rotational direction from the engaged clamping position to the disengaged clamping position, the first and second upstanding clamp holder elements are configured to be displaced outwardly away from one another so as to release the portable electronic device from the dock.

2. The dock according to claim 1, wherein the clamping apparatus further comprises a first spring member operatively coupled to the first sliding member and a second spring member operatively coupled to the second sliding member;
    wherein the first and second spring members are configured to bias the first and second sliding members in the disengaged clamping position; and
    wherein the first and second spring members are configured to regulate the opposed forces that are applied to opposite sides of the portable electronic device.

3. The dock according to claim 1, wherein the clamping apparatus further comprises a first pad member attached to the first upstanding clamp holder element of the first sliding member and a second pad member attached to the second upstanding clamp holder element of the second sliding member; and
    wherein, when the user rotates the activation lever in the first rotational direction from the disengaged clamping position to the engaged clamping position, the first and second pad members are configured to be clamped against opposite sides of the portable electronic device.

4. The dock according to claim 1, wherein the clamping apparatus further comprises a base plate configured to secure the clamping apparatus to the dock;
    wherein the first sliding member and the second sliding member are each displaceably coupled to the base plate such that the first sliding member and the second sliding member are displaced relative to the base plate when the user rotates the activation lever in the first rotational direction from the disengaged clamping position to the engaged clamping position, and when the user rotates the activation lever in the second rotational direction from the engaged clamping position to the disengaged clamping position.

5. The dock according to claim 1, wherein the dock is in a form of a battery charging station for the portable electronic device, the battery charging station comprising a recess for receiving a bottom portion of the portable electronic device.

6. The dock according to claim 5, wherein the portable electronic device received within the recess of the battery charging station comprises one of: (i) a battery for a mobile electronic device, and (ii) a mobile electronic device that includes a battery.

* * * * *